United States Patent

Thornton, Jr. et al.

[15] 3,670,194
[45] June 13, 1972

[54] COLOR-CORRECTED HIGH-PRESSURE MERCURY-VAPOR LAMP

[72] Inventors: William A. Thornton, Jr., Cranford; Melvin C. Unglert, Wyckoff, both of N.J.

[73] Assignee: Westinghouse Electric Corporation, Pittsburgh, Pa.

[22] Filed: Jan. 26, 1971

[21] Appl. No.: 109,802

[52] U.S. Cl. ...................................313/109, 252/301.4 P
[51] Int. Cl. .....................................H01j 61/44, H01j 61/48
[58] Field of Search....................313/25, 92, 108, 109, 220, 313/227; 252/301.4 R, 301.4 P

[56] References Cited

UNITED STATES PATENTS

| | | | |
|---|---|---|---|
| 3,328,620 | 6/1967 | Rimbach | 313/109 |
| 3,417,027 | 12/1968 | Wanmaker et al. | 313/109 X |
| 3,483,415 | 12/1969 | Ozawa et al. | 313/92 |
| 3,513,103 | 5/1970 | Schaffer | 252/301.4 P |
| 3,569,762 | 3/1971 | Levine et al. | 313/109 |

*Primary Examiner*—Roy Lake
*Assistant Examiner*—Siegfried H. Grimm
*Attorney*—A. T. Stratton, W. D. Palmer and D. S. Buleza

[57] ABSTRACT

Color-corrected high-pressure mercury-vapor lamp provides good color rendition of illuminated objects, and especially good color rendition of flesh tones. The lamp utilizes a particular phosphor coating principally comprising a two-component blend. One of the phosphor blend components provides an emission in the shorter wavelength region of the visible spectrum peaking at from 440 nm to 470 nm, and an example of this component is a strontium chlorophosphate having an apatite structure and activated by a divalent europium. The other phosphor component provides an emission in the longer wavelength region of the visible spectrum peaking at from 605 nm to 630 nm, and an example of this phosphor component is yttrium phosphate-vanadate activated by tervalent europium. For the foregoing examples, the relative weight ratio of the one phosphor component to the other phosphor component is from 0.05:1 to 0.4:1.

9 Claims, 9 Drawing Figures

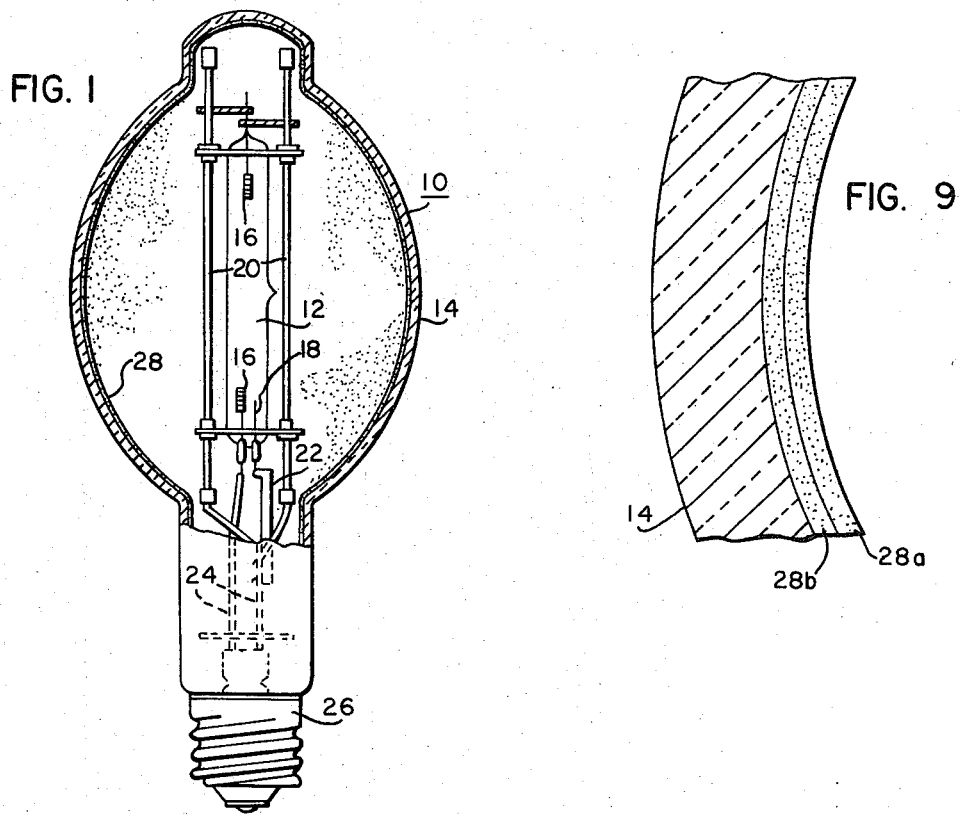
FIG. 1
FIG. 9
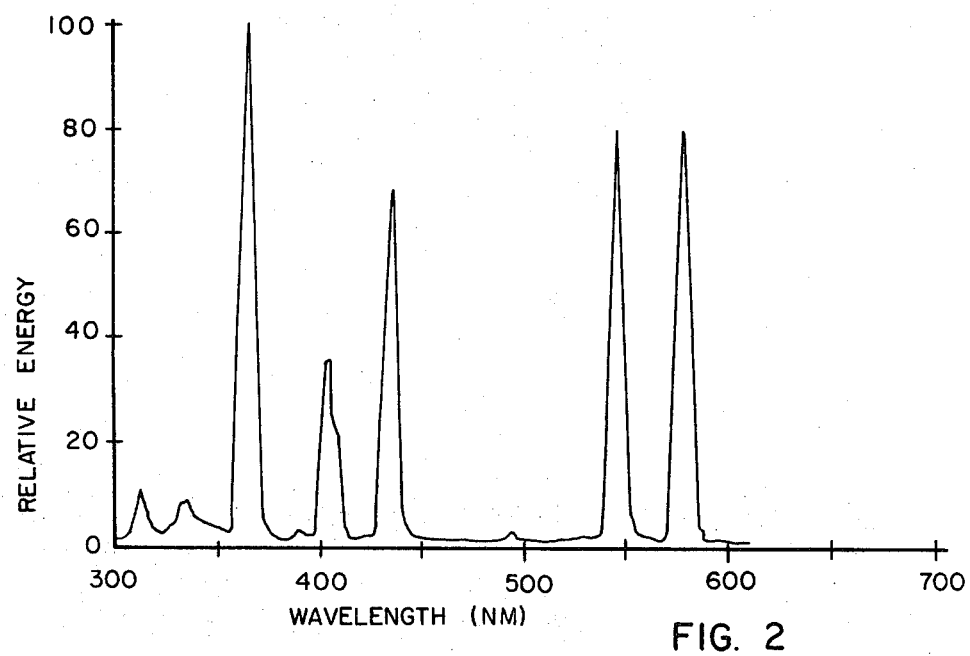
FIG. 2

3,670,194

COLOR-CORRECTED HIGH-PRESSURE MERCURY-VAPOR LAMP

BACKGROUND OF THE INVENTION

High-pressure mercury-vapor lamps are the usual type of lighting utilized for highways, parking lots, highbay factories and similar applications. While the color of such lamps is not displeasing, the color rendition of illuminated objects, and particularly the color rendition of flesh tones, is extremely poor. In order to improve the color rendition of illuminated objects, a coating of red-fluorescing phosphor material has been placed on the inner surface of the outer envelope in order to utilize the otherwise wasted ultraviolet radiations which are generated by the arc, and such a modified high-pressure lamp is described in U.S. Pat. No. 2,748,303, dated May 29, 1956. While the color rendition of illuminated objects, and the color rendition of flesh tones, is somewhat improved by the use of such a red fluorescing material, the color appearance of such illuminated objects is still relatively poor. This has limited the use of such mercury lamps for applications where good color rendition of illuminated objects, and particularly good color rendition of flesh tones, is desired.

The internationally accepted method for standardizing and measuring the color rendering properties of light sources is set forth in the publication of the International Commission on Illumination, identified as publication C.I.E. No. 13 (E-1.3.2.) 1965.

SUMMARY OF THE INVENTION

The disclosed color-corrected high-pressure mercury-vapor lamp provides good color rendition of illuminated objects, and especially good color rendition of human flesh tones. The lamp comprises an arc tube which emits both visible and ultraviolet radiations and this arc tube is surrounded by an outer envelope, as is conventional. A phosphor coating is carried on the inner surface of the outer envelope and the phosphor coating substantially comprises two phosphor components. One of the phosphor components when excited by the ultraviolet radiations has a fluorescent output which is substantially confined to the shorter wavelength region of the visible spectrum and has its peak of emission at from 440 nm to 470 nm. The other of the phosphor components when excited by the ultraviolet radiations has a fluorescent output which is substantially confined to the longer wavelength region of the visible spectrum and has its peak of emission at from 605 nm to 630 nm. The relative wattage output of the short wavelength emission of the one phosphor component to the long wavelength emission of the other phosphor component is from 0.05:1 to 0.4:1.

BRIEF DESCRIPTION OF THE DRAWINGS

For a better understanding of the invention, reference may be had to the preferred embodiment, exemplary of the invention, shown in the accompanying drawings, in which:

FIG. 1 is an elevational view, shown partly in section, of a high-pressure mercury-vapor lamp which incorporates a phosphor coating in accordance with the present invention;

FIG. 2 is a graph of relative energy versus wavelength showing the spectral output of a standard high-pressure mercury-vapor lamp at wavelengths of from 300 nm to 700 nm;

FIG. 9 is an enlarged fragmentary sectional view of a coated envelope wherein the phosphor components are applied as two separate layers.

DESCRIPTION OF THE PREFERRED EMBODIMENT

Figure 3:
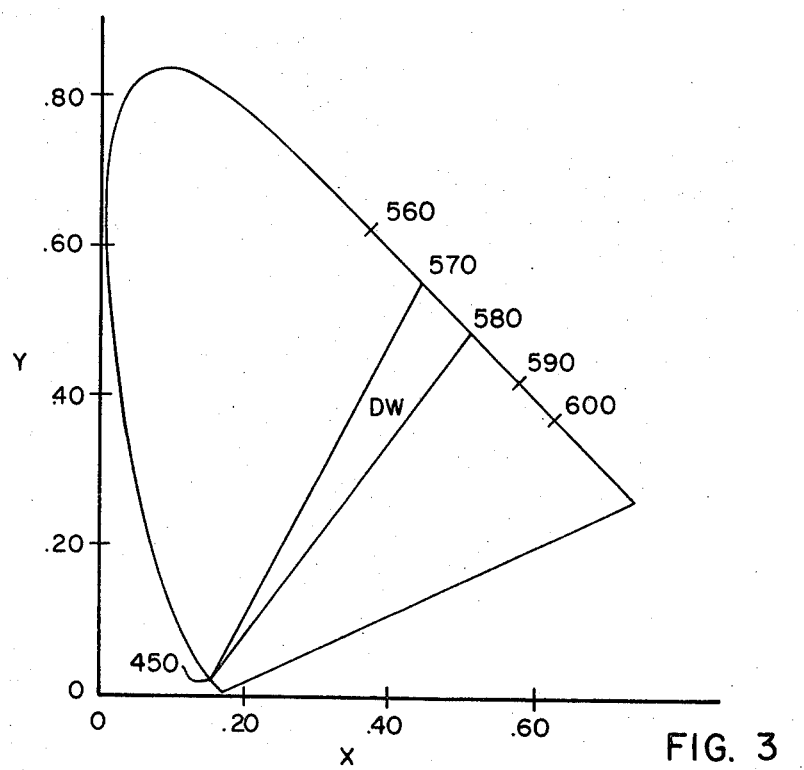
FIG. 3 sets forth the x, y-chromaticity diagram of the ICI system with the x-y coordinates for a so-called deluxe white mercury lamp superimposed thereon and with a band drawn thereon which describes that complementary color which will best compensate for the yellow radiations of the mercury lamp.

With specific reference to the form of the invention as shown in the drawings, the numeral 10 in FIG. 1 illustrates generally a high-pressure, mercury-vapor lamp comprising an inner arc tube 12 which is surrounded by a vitreous, light-transmitting outer envelope 14. The construction of the inner arc tube 12, which is normally fabricated of quartz, is well known and includes main electrodes 16 operatively disposed at either end thereof with a starting electrode 18 positioned proximate one of the main electrodes 16. The inner arc tube 12 is suitably supported within the outer envelope 14 by a conventional supporting frame 20 and a starting resistor 22 is used to connect the starting electrode 18 to one side of the energizing potential. Energizing potential is supplied to the electrodes 16 of the power-operable arc tube through conventional lead-in conductors 24, which in turn electrically connect to a conventional screw-type base 26. The inner surface of the envelope 14 carries a coating 28 principally comprising two phosphor components, as will be described in detail hereinafter.

In FIG. 2 is shown the spectral emission of a bare or otherwise uncorrected high-pressure mercury-vapor arc for wavelength of from 300 nm to 700 nm. There are also present other strong ultraviolet lines at wavelengths shorter than 300 nm, although these are not shown. In the practices of the prior art, it has been customary to color-correct the output of the mercury arc by adding long wavelength radiations, such as by coating the inner surface of the outer envelope with phosphor of the type described in the aforementioned U.S. Pat. No. 2,748,303 or by utilizing other type phosphors such as yttrium vanadate or yttrium phosphate-vanadate activated by a tervalent europium. While such a phosphor somewhat improves the color rendition of illuminated objects, the color of human flesh tones is still quite poor. In accordance with the present invention, it has been found that this poor color rendition of flesh tones is due to the very strong yellow radiations which are emitted by the mercury arc.

In the x,y-chromaticity diagram shown in FIG. 3, the color of the conventional so-called delux white mercury lamp which incorporates a vanadate type phosphor for color correction is shown by the indicia "DW." Superimposed thereon are two lines extending from the 570 nm and 580 nm "yellow" portion of the diagram to the 450 nm blue portion of the diagram indicating that the objectionable yellow radiation from the mercury arc must be compensated by blue radiations in the neighborhood of 450 nm. The blue radiations are of course complementary to the yellow and if blue radiations are added in combination with the longer wavelength radiations produced by the vanadate type phosphor, the color rendition of illuminated objects, and particularly flesh tones, is substantially improved, as will be shown hereinafter.

Figure 4:
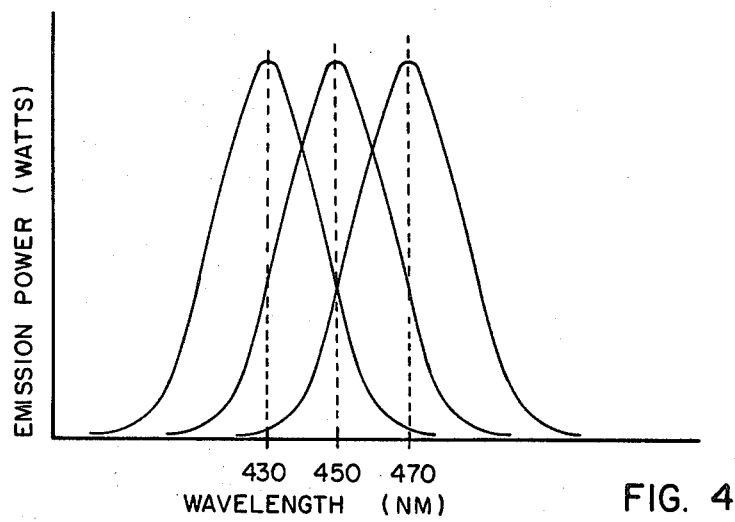
FIG. 4 is a graph of emission power (watts) versus wavelength in nanometers for three different fluorescent emissions which peak respectively at 430 nm, 450 nm and 470 nm.
Figure 5:
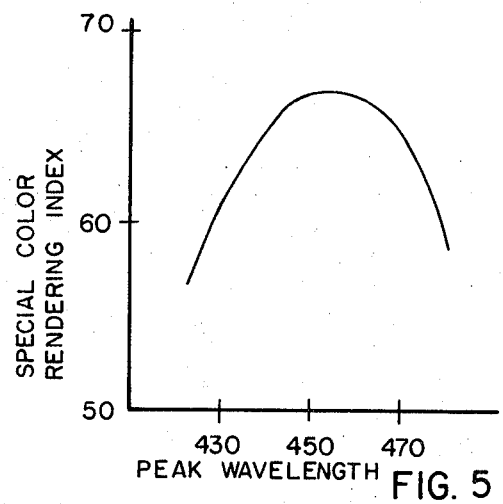
FIG. 5 is a graph of color rendering index versus wavelength showing the resulting color rendering index of the yellow colored object utilized by the International Commission on Illumination (publication CIE No. 13) when illuminated by a so-called delux white mercury vapor lamp as modified by the addition of short visible wavelength radiations having peaks of emission varying from 430 to 480 nm.

In order to illustrate the improvement in color rendition of flesh tones obtained by adding blue radiations of the specified wavelength to the normal emission of the so-called deluxe white color corrected mercury lamp, blue radiations having a narrow band with a peak of emission varying from 430 to 470 nm were added as a component, with the spectral distribution of the added emissions shown in FIG. 4. The lamp as modified was then used to illuminate the "yellow" sample as is specified by the aforementioned International Commission on Illumination; the yellow sample was used for this purpose since of the various eight color samples which are specified, the yellow color most closely approximates that of human flesh tones. As shown in FIG. 5, a peak of color rendering index was obtained with the added blue radiation peaking at about 450 nm and in order to have a good color rendering index, the added blue radiations should peak at from about 440 nm to 470 nm.

Figure 6:
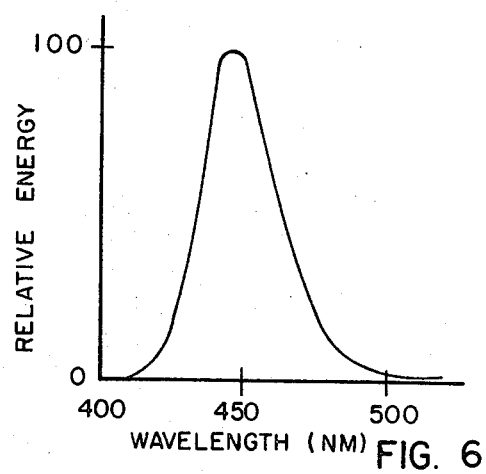
FIG. 6 is a graph of relative energy versus wavelength illustrating the spectral distribution for strontium chlorapatite which is activated by a divalent europium.

In FIG. 6 is shown the spectral distribution of a preferred phosphor component which, when excited by the ultraviolet radiations generated by the arc tube, has a fluorescent output which is substantially confined to the shorter wavelength region of the visible spectrum and with a peak of emission within the range of from 440 nm to 470 nm. More specifically, this phosphor is composed of a matrix of chloro-apatite or bromo-apatite or chlorobromo-apatite of alkaline-earth metal wherein the alkaline-earth metal is at least one of calcium, barium and strontium, the halogen is at least one of chlorine and bromine, and divalent europium is present in an activating proportion. A preferred embodiment of such a phosphor is strontium chlorapatite activated by divalent europium. Such a phosphor is described in copending application Ser. No. 726,464, filed May 3, 1968, and owned by the present assignee. As a specified example, the phosphor is prepared by mixing 0.6 mol of $SrHPO_4$, 0.27 mol of $SrCO_3$, 0.11 mol of $SrCl_2$ and 0.02 mol of $EuCO_3$. Added to this raw mix is 0.25 mol of additional $SrCl_2$ which serves as a flux during firing. The raw mix is then fired in a reducing atmosphere, for example, a 90 percent nitrogen-10 percent hydrogen atmosphere at from 900° to 1,200° C. and preferably at 1,100° C. for about 3 hours. After cooling, the phosphor is broken up and leached with distilled water to remove residual soluble strontium chloride flux. The phosphor has an emission peak at about 446 to 450 nm and its output comprises a narrow band in the shorter wavelength regions of the visible spectrum. Other preferred phosphor embodiments are calcium-strontium chlorapatite and calcium chlorapatite, both activated by divalent europium; the blue emissions of these latter examples peak at about 455 nm.

Figure 7:
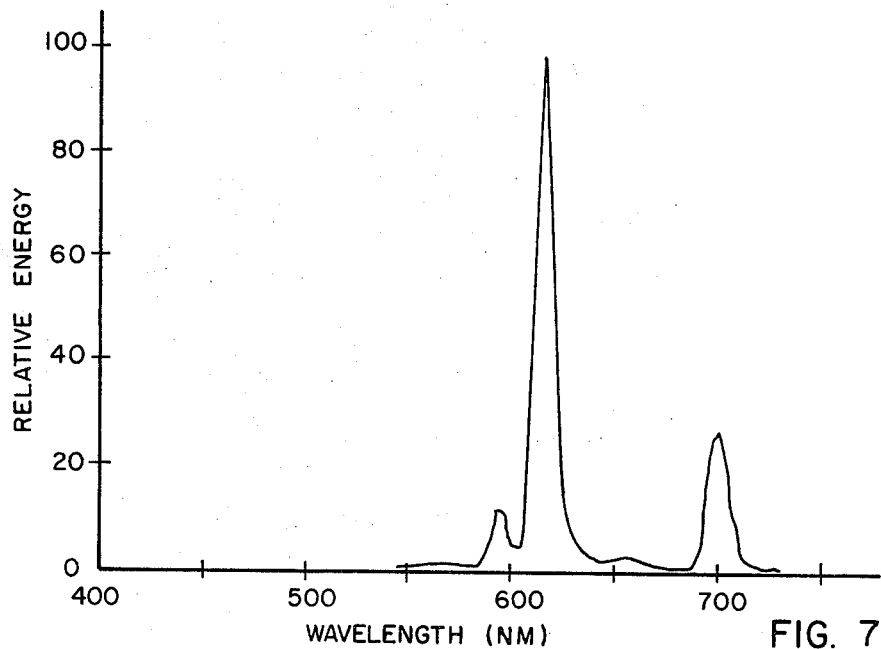
FIG. 7 is a graph of relative energy versus wavelength illustrating the spectral distribution for yttrium phosphate-vanadate activated by tervalent europium.

In FIG. 7 is shown the spectral output of yttrium phosphate-vanadate activated by tervalent europium which has an emission peak at about 620 nm. Such a phosphor is well known in the phosphor art and is used to color correct the output of mercury lamps. As an example for preparing such phosphor, equal mol parts of yttrium vanadate and yttrium phosphate are mixed with the required activator and the mixture is fired at 1,150° C. for 6 ½ hours and in air atmosphere. Alternatively, yttrium vanadate activated by europium could be used instead of the vanadate-phosphate and the spectral emissions of these two phosphors are substantially identical.

Figure 8:
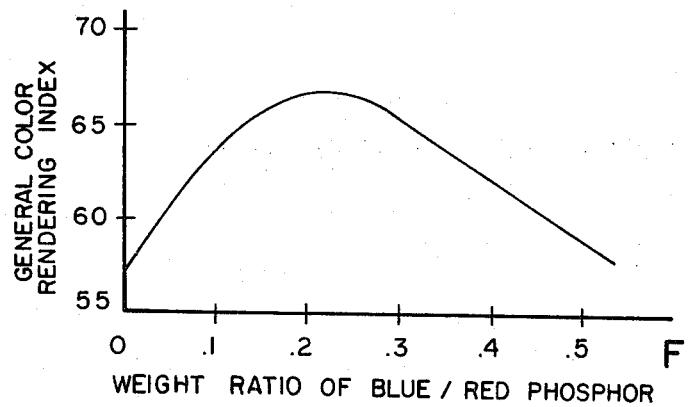
FIG. 8 of a graph of color rendering index versus weight ratio of phosphor components.

In FIG. 8 is shown the general color rendering index for a mercury lamp which is color corrected in accordance with the present invention versus the weight ratio of the blue to the red phosphor for the specific preferred embodiments as described hereinbefore. Both of these phosphors have approximately the same so-called quantum efficiency. Accordingly, the relative wattage output of the short wave emission of one phosphor component to the wattage output of the long wave emission of the other phosphor component is substantially equal to the relative weight ratios of these phosphors. As shown in FIG. 8, in order to have an acceptable overall color rendering index, the weight ratios (or relative wattage outputs) of the short wave emitting phosphor to the long wave emitting phosphor should be from 0.05:1 to 0.4:1 a better color rendering index is achieved with a weight ratio (or relative wattage output) of from 0.1:1 to 0.3:1. The preferred weight ratio (or relative wattage output) is about 0.2:1. The overall result is that not only are the human flesh tones substantially improved with respect to their appearance, but the overall color rendering index of the lamp is also substantially improved. As is shown in FIG. 8, the color rendering index of the so-called deluxe white lamp of the prior art, which utilizes only the so-called vanadate-phosphate or vanadate phosphor, is approximately 57. This is improved to approximately 67 by the addition of the preferred amount of the short wavelength emitting phosphor material.

The amount of phosphor which is used is subject to considerable variation. Preferably the phosphor components are mixed in the preferred ratio as specified hereinbefore and coated onto the envelope to a thickness such that the arc tube can be seen faintly against a strong light through the phosphor layer. This will normally require from one to eight milligrams of phosphor per square centimeter of coated area, and preferably about three $mg/cm^2$.

As an alternative embodiment, the individual phosphors can be applied in separate layers 28a and 28b, as shown in the fragmentary enlarged view of FIG. 9.

A small amount of additional phosphor or phosphors can be added to the foregoing two-component blend for additional color-rendering properties. As an example, 2 percent by weight of tin-activated strontium magnesium phosphate will add a small amount of range radiations.

We claim as our invention:

1. A color-corrected high-pressure mercury-vapor lamp which provides good color rendition of illuminated objects, and especially good color rendition of human flesh tones, said lamp comprising an arc tube which emits both visible and ultraviolet radiations, and an outer envelope surrounding said arc tube, a phosphor coating carried on the inner surface of said outer envelope, said phosphor coating substantially comprising two phosphor components, one of said phosphor components when excited by said ultraviolet radiations having a fluorescent output which is substantially confined to the shorter wavelength region of the visible spectrum and having its peak of emission at from 440 nm to 470 nm, the other of said phosphor components when excited by said ultraviolet radiations having a fluorescent output which is substantially confined to the longer wavelength region of the visible spectrum and having its peak of emission at from 605 nm to 630 nm, and the relative wattage output of the short wavelength emission of said one phosphor component to the long wavelength emission of said other phosphor component being from 0.05:1 to 0.4:1.

2. The lamp as specified in claim 1, wherein said one phosphor has its peak of emission at about 450 nm, and said other phosphor has its peak of emission at about 620 nm.

3. A color-corrected high-pressure mercury-vapor lamp which provides good color rendition of illuminated objects, and especially good color rendition of human flesh tones, said lamp comprising an arc tube which emits both visible and ultraviolet radiations, and an outer envelope surrounding said arc tube, a phosphor coating carried on the inner surface of said outer envelope, said phosphor coating substantially comprising two phosphor components, one of said phosphor components is a matrix of chlorapatite or bromapatite of alkaline-earth metal wherein the alkaline-earth metal is at least one of calcium, barium and strontium, the halogen is at least one of chlorine and bromine, and divalent europium is present in an activating proportion, and the other of said phosphor components is a matrix of yttrium vanadate or yttrium phosphate vanadate with an activating proportion of tervalent europium, and the relative weight ratio of said one phosphor to said other phosphor is from 0.05:1 to 0.4:1.

4. The lamp as specified in claim 3, wherein the relative weight ratio of said one phosphor to said other phosphor is from 0.1:1 to 0.3:1.

5. The lamp as specified in claim 3, wherein the relative weight ratio of said one phosphor to said other phosphor is about 0.2:1.

6. The lamp as specified in claim 3, wherein said phosphate matrix is strontium or calcium chlorapatite.

7. The lamp as specified in claim 3, wherein said phosphor is coated to a weight of from 1 to 8 $mg/cm^2$ of coated surface.

8. The lamp as specified in claim 3, wherein said one phosphor and said other phosphor are admixed as a generally uniform coating.

9. The lamp as specified in claim 3, wherein said one phosphor and said other phosphor are coated as separate layers.

* * * * *